(12) United States Patent
Kataoka et al.

(10) Patent No.: US 7,755,231 B2
(45) Date of Patent: Jul. 13, 2010

(54) RESOLVER AND MANUFACTURING METHOD OF THE SAME

(75) Inventors: Nakaba Kataoka, Kyoto (JP); Keita Nakanishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 307 days.

(21) Appl. No.: 11/971,923

(22) Filed: Jan. 10, 2008

(65) Prior Publication Data

US 2008/0169713 A1    Jul. 17, 2008

(30) Foreign Application Priority Data

Jan. 11, 2007    (JP) ............................. 2007-003776

(51) Int. Cl.
*H02K 3/50* (2006.01)
*H02K 15/10* (2006.01)

(52) U.S. Cl. .............................. 310/71; 310/43; 29/596

(58) Field of Classification Search .................... 310/71
See application file for complete search history.

(56) References Cited

U.S. PATENT DOCUMENTS

| | | | |
|---|---|---|---|
| 5,760,505 A * | 6/1998 | Farou et al. .................... 310/71 |
| 5,920,135 A * | 7/1999 | Ohshita ........................ 310/71 |
| 6,031,307 A | 2/2000 | Ohshita | |
| 6,044,545 A | 4/2000 | Ohshita | |
| 6,333,579 B1 * | 12/2001 | Hirano et al. ................ 310/194 |
| 6,933,636 B2 * | 8/2005 | Miya et al. ..................... 310/71 |
| 7,159,296 B2 * | 1/2007 | Miya et al. ..................... 29/598 |
| 7,309,936 B2 * | 12/2007 | Utsumi et al. .................. 310/71 |
| 7,635,933 B2 * | 12/2009 | Makino et al. ................. 310/71 |
| 2007/0007832 A1 * | 1/2007 | Ichikawa et al. .............. 310/71 |

FOREIGN PATENT DOCUMENTS

| | | |
|---|---|---|
| JP | 2000-340272 A | 12/2000 |
| JP | 2004-135430 A | 4/2004 |
| JP | 3641466 B2 | 4/2005 |

* cited by examiner

*Primary Examiner*—Burton Mullins
(74) *Attorney, Agent, or Firm*—Keating & Bennett, LLP

(57) ABSTRACT

In a resolver of a motor, a plurality of wires forming a plurality of coils arranged at a resolver stator portion are arranged at a wiring surface which is arranged at a terminal block of a connector portion and extends between an annular shape surface arranged substantially perpendicularly to a central axis at a core back of an insulator and a plurality of terminal pins, and are connected to a control unit via the terminal pins. Each of the wires of the resolver includes a slackened portion formed at a portion thereof between corresponding terminal pins and corresponding coils. The slackened portion is accommodated in a groove portion arranged at the wiring surface of the connector portion in order to minimize the possibility of damaging the wire improving reliability of the connection between the terminal pin and the coil.

10 Claims, 16 Drawing Sheets

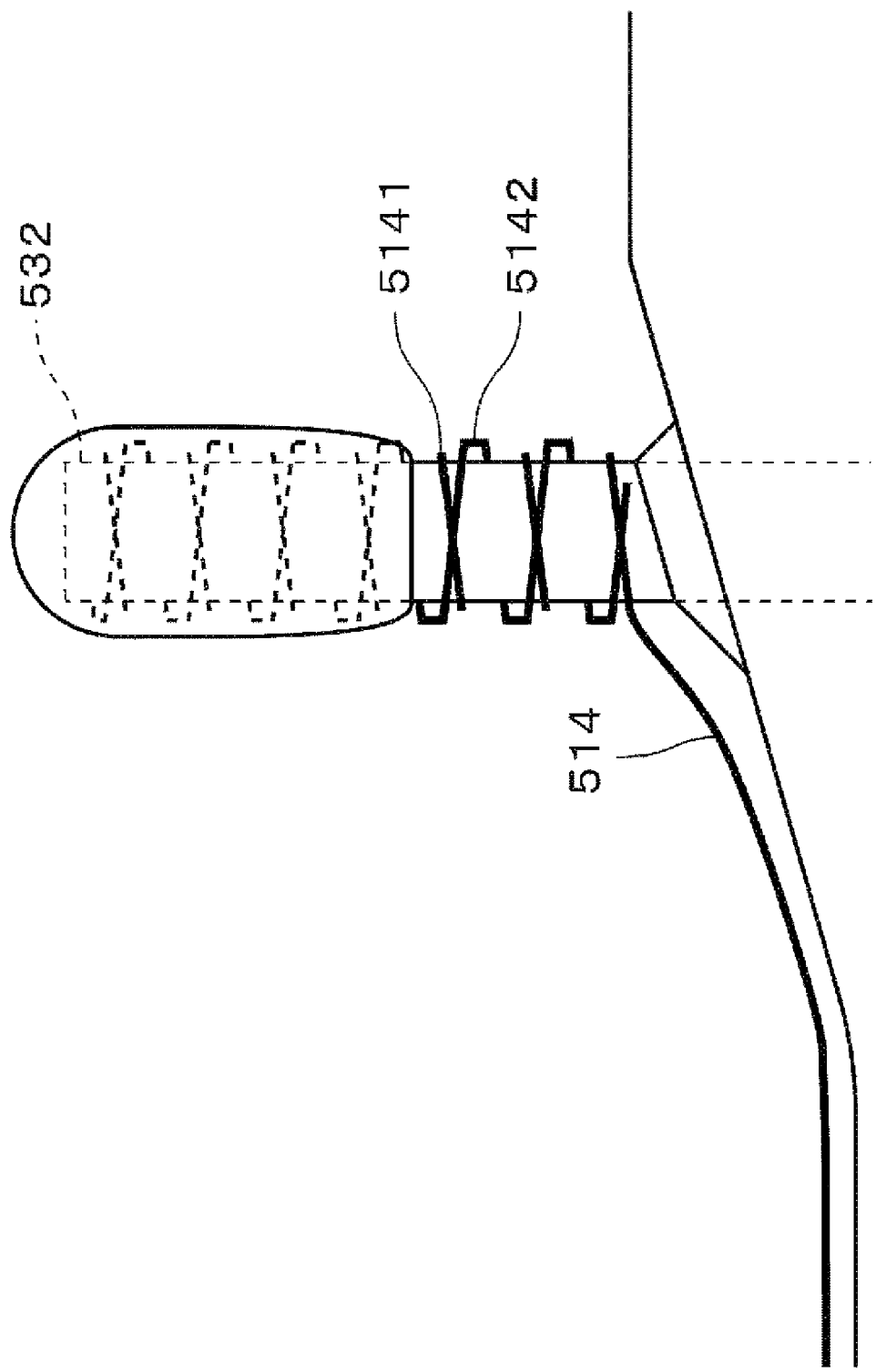

RESOLVER AND MANUFACTURING METHOD OF THE SAME

BACKGROUND OF THE INVENTION

1. Field of the Invention

The present invention relates to a resolver which detects an angular position of an object, and a manufacturing method of the resolver.

2. Description of the Related Art

Conventionally, a hydraulic power steering apparatus is used in a vehicle such as a passenger car or the like to assist an operator in maneuvering the vehicle. The hydraulic power steering apparatus uses a pump operated by an engine of the vehicle to generate force to assist the operator's steering. In recent years, an electric power steering (EPS) which uses a motor operated by a vehicle battery has become available. The EPS is more power efficient than the conventional hydraulic power steering.

In order to achieve highly accurate performance, the EPS requires an angle detection mechanism which is operable to accurately detect a rotary angle of the motor. Further, components used in the vehicle are required to function in various types of environments for a long period of time, and therefore, high reliability is expected of the angle detection mechanism of the EPS, which is one of the components used in the vehicle.

Therefore, a resolver of a variable reluctance type having an environmental resistance higher than an optical encoder or a magnetic encoder is often used as the angle detection mechanism for the EPS. In such a resolver, an exciting coil and an output coil (collectively "coils") of a stator portion are formed by winding a wire around a plurality of teeth by using a winding apparatus, wherein an end portion of the wire is connected to a terminal pin arranged above a terminal block by welding or the like.

The conventional method of connecting the wire to the terminal pin, however, has a problem in that the connection between the wire and the terminal pin may be damaged by shocks and vibrations applied thereto from the vehicle due to a small radius of the wire used to form the coils. Further, when the wire which is wound around the terminal pin becomes unwound before the wire is welded to the terminal pin, the connection between the wire and the terminal pin is easily damaged due to the shocks and vibrations of the vehicle applied thereto.

Further, since the connection between the wire and the terminal pin is usually executed by a method such as welding which involves heat applied to the wire and the terminal pin, a terminal block which retains the terminal pin and which is made of a resin material may be deformed by the heat during the welding. Such deformation may cause the wire extending from the terminal pin to the coil to be erroneously connected to the terminal block causing the wire to be damaged by the shocks and vibrations of the vehicle.

SUMMARY OF THE INVENTION

In order to overcome the problems described above, a preferred embodiment of the present invention provides a resolver which includes at a wiring surface arranged at a terminal block a groove portion at which a plurality of slackened portions of wires are accommodated. By virtue of such configuration, damage which may occur to the wires is minimized thereby improving reliability of the connection between.

Also, another preferred embodiment of the present invention provides a resolver having a plurality of wires, each having a first winding portion which is wound around a terminal pin from a substantially bottom end portion thereof toward the tip portion thereof, and a second winding portion which is wound around the terminal pin from the substantially tip portion thereof toward the bottom portion thereof partially overlapping with the first winding portion. The wires and the terminal pins are soldered or welded to one another so as to be connected. By virtue of such configuration, the possibility of the wire coming unwound from the terminal pin before the welding is carried out is minimized.

Also, a manufacturing method of the resolver according to another preferred embodiment of the present invention includes a step of forming a stator portion and a connector portion at which a wiring surface is arranged above the terminal block and includes a groove portion, a step of winding one end of a wire whose other end is wound around either one of the terminal pin and the tooth around either one of the corresponding terminal pin and the corresponding tooth detouring around a jig arranged at a shortest route connecting the either one of the terminal pin and the tooth and the either one of the corresponding terminal pin and the corresponding tooth, a step of forming a slackened portion at the wire by removing the jig from its original position, and a step accommodating the slackened portion at the groove portion of the connector portion. By such method, the reliability of the connection between the terminal pins and the coils is improved.

Other features, elements, steps, characteristics and advantages of the present invention will become more apparent from the following detailed description of preferred embodiments thereof with reference to the attached drawings.

BRIEF DESCRIPTION OF THE DRAWINGS

FIG. 11B is a schematic diagram showing an enlarged view of a terminal pin according to the first preferred embodiment of the present invention.

DETAILED DESCRIPTION OF THE PREFERRED EMBODIMENTS

Figure 1:
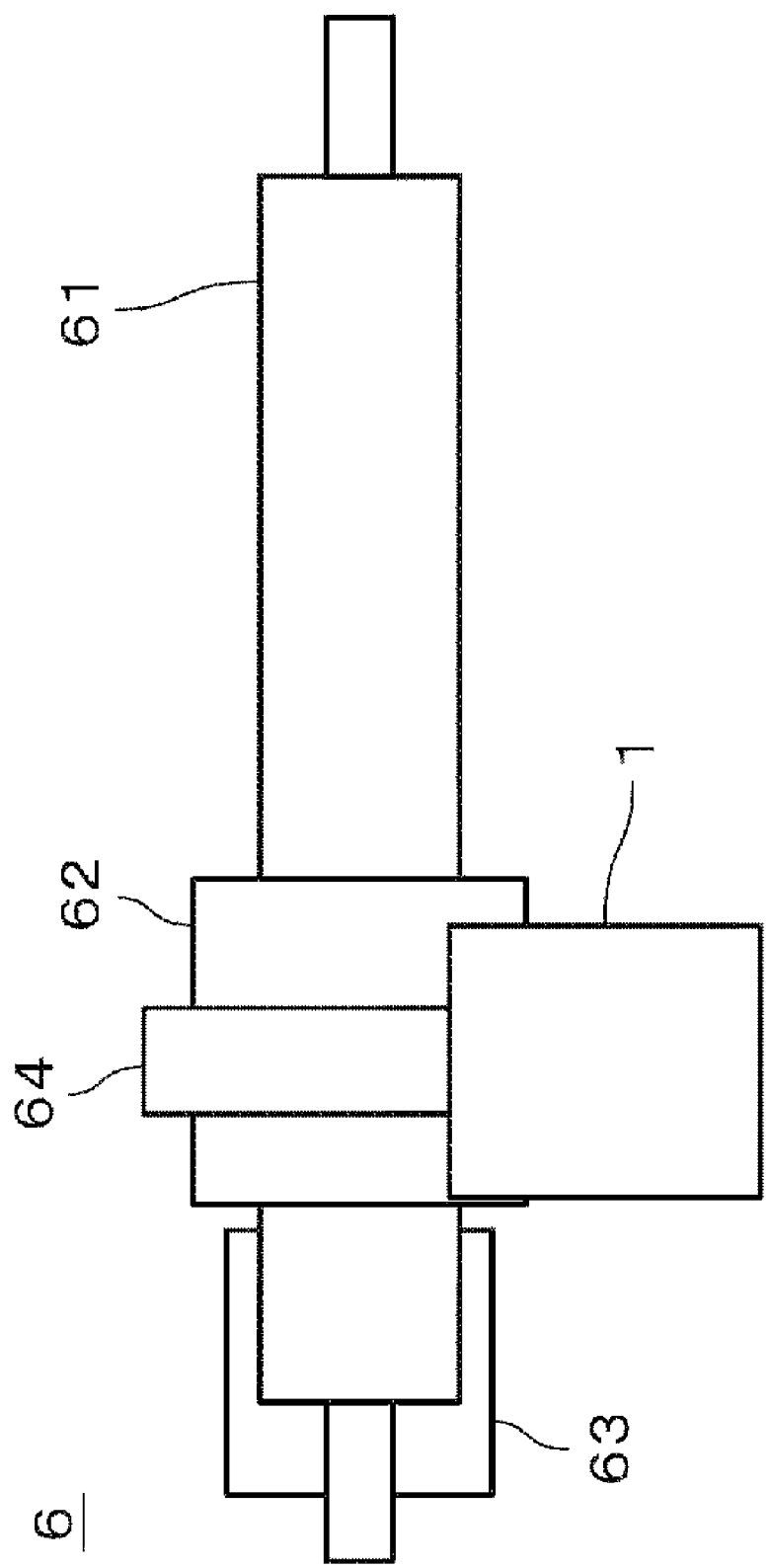
FIG. 1 is a schematic diagram of a power steering having a resolver according to a first preferred embodiment of the present invention.

Note that in the description of preferred embodiments of the present invention herein, words such as upper, lower, left, right, upward, downward, top and bottom for describing positional relationships and directions merely indicate positional relationships and directions in the drawings. Such words do not indicate positional relationships and directions of the members mounted in an actual device. Also note that reference numerals, figure numbers and supplementary descriptions are shown below for assisting the reader in finding corresponding components in the description of the preferred embodiments below to facilitate the understanding of the present invention. It is understood that these expressions in no way restrict the scope of the present invention.

FIG. 1 is a schematic diagram of a power steering apparatus 6 having a resolver according to a first preferred embodiment of the present invention. The power steering apparatus 6 is preferably used in a vehicle such as a passenger car or the like to assist steering operations.

As shown in FIG. 1, the power steering apparatus 6 preferably includes a shaft portion 61 which is connected to a steering mechanism (e.g., steering wheel, axle and/or the like), a sensor 62 which detects a force applied to the steering mechanism, a control unit 63 which calculates an amount of force necessary to assist steering based on an output from the sensor 62, a motor 1 which generates a torque in accordance with the output from the control unit 63, and a deceleration mechanism 64 which communicates with the steering mechanism in accordance with the motor 1. By virtue of such configuration, an operator is allowed to use a relatively small amount of force to steer the vehicle or the like having the power steering apparatus 6.

Figure 2:
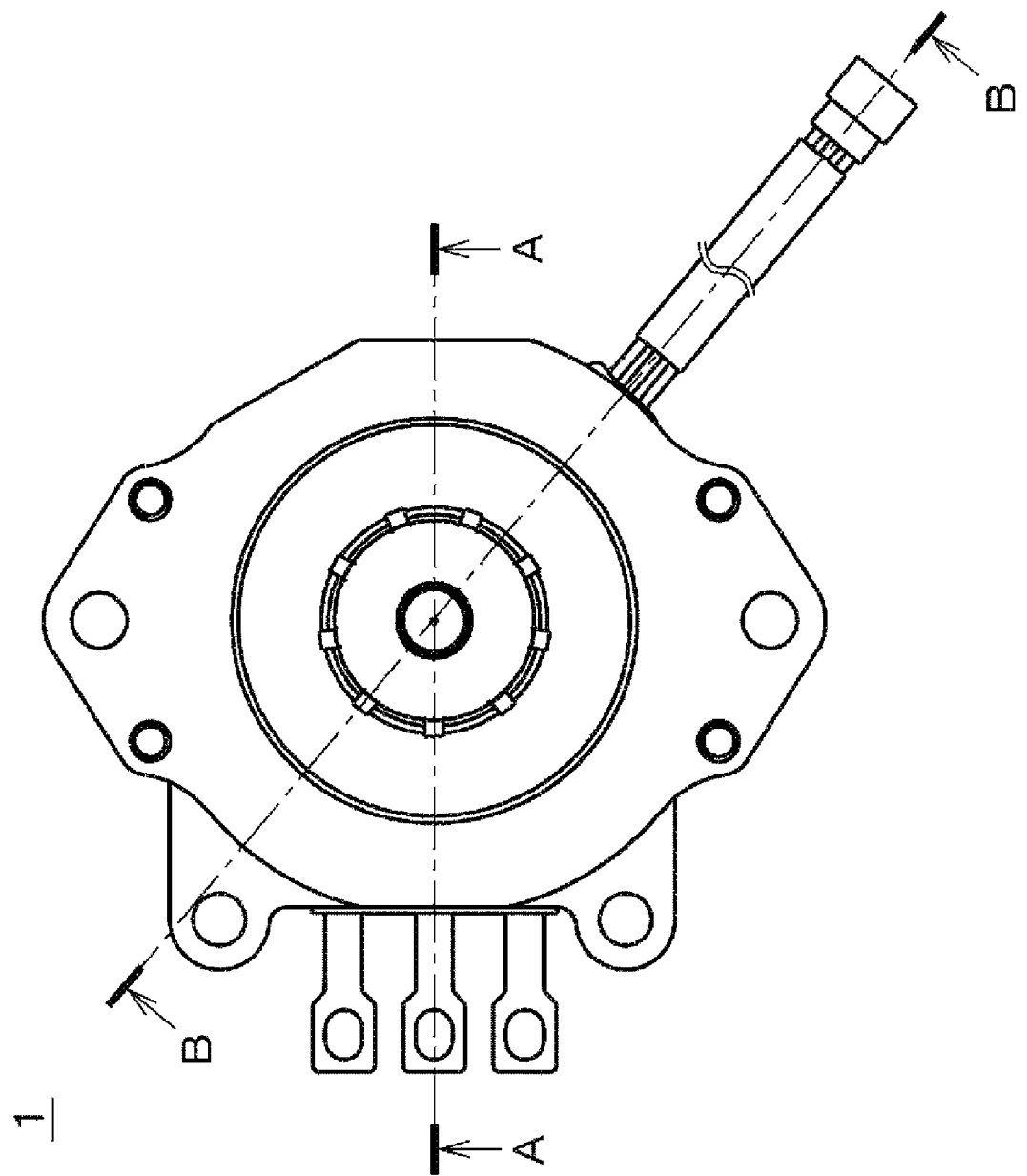
FIG. 2 is a schematic plan view of a motor according to the first preferred embodiment of the present invention.
Figure 3:
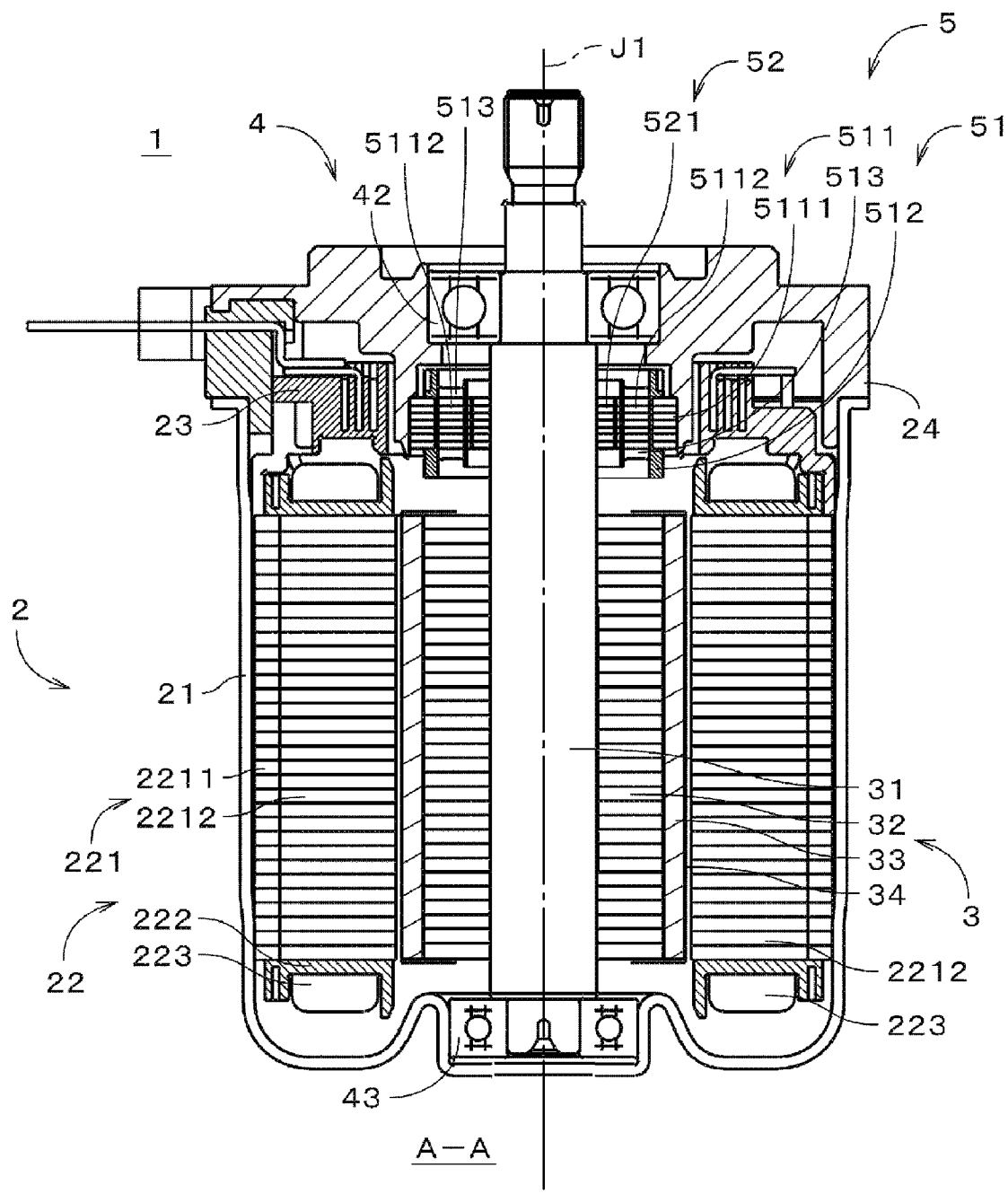
FIG. 3 is a schematic cross sectional view of the motor according to the first preferred embodiment of the present invention.

FIG. 2 is a schematic plan view of the motor 1 according to the first preferred embodiment of the present invention. FIG. 3 is a schematic cross sectional view of the motor 1 taken along a segment line A-A shown in FIG. 2. Note that a housing 21 shown in FIG. 3 (and in FIG. 5) is depicted without parallel diagonal lines. As shown in FIG. 3, the motor 1 which is an inner rotor type preferably includes a motor stator portion 2 which is a fixed assembly, a motor rotor portion 3 which is a rotatable assembly, a bearing mechanism 4 which rotatably supports, concentrically with a central axis J1, the motor rotor portion 3 with respect to the motor stator portion 2, and a resolver 5 of a variable reluctance type which detects an angle position of the motor rotor portion 3 with respect to the motor stator portion 2.

The motor stator portion 2 preferably includes the housing 21 having a substantially cylindrical shape having a bottom portion, an armature 22 attached to an inner circumferential surface of the housing 21, a bus bar unit 23 attached to the inner circumferential surface of the housing 21 above the armature 22 and connecting the armature 22 to an external power supply, and a bracket 24 having a substantially cylindrical shape arranged above the bus bar unit 23.

The armature 22 preferably includes a stator core 221 formed by laminating a plurality of thin silicon steel plates. The stator core 221 preferably includes a core back 2211 having a substantially annular shape, and a plurality (for example, preferably 12 in the present preferred embodiment) of teeth 2212 each extending from the core back 2211 toward the central axis J1. The armature 22 preferably includes an insulator 222 covering a surface of the stator core 221, and a plurality of coils 223 formed by winding a wire around the plurality of teeth 2212 via the insulator 222.

The motor rotor portion 3 preferably includes a shaft 31 concentric with the central axis J1, a yoke 32 having a substantially cylindrical shape arranged surrounding the shaft 31, a field magnet 33 affixed via an adhesive to an outer circumferential surface of the yoke 32, and a cover member 34 made of a non-magnetic material arranged covering an outer side of the field magnet 33 so as to minimize the possibility of the field magnet 33 being removed from the yoke 32. The yoke 32 is formed by laminating thin magnetic steel plates. According to the motor 1 of the present preferred embodiment, the field magnet 33 is arranged inwardly of the armature 22.

The bearing mechanism 4 preferably includes an upper bearing 42 arranged at an inner circumferential surface of the bracket 24, and a lower bearing 43 arranged at a central bottom portion of the housing 21. The shaft 31 of the motor rotor portion 3 protrudes upwardly of the bracket 24 via an opening at the bracket 24 and is rotatably supported by the upper bearing 42 and the lower bearing 43.

The resolver 5 preferably includes a resolver stator portion 51 having a substantially annular shape concentric with the central axis J1, and a resolver rotor portion 52 which is affixed to the shaft 31 at a portion above the yoke 32 and disposed radially inwardly of the resolver stator portion 51. The resolver rotor portion 52 preferably includes a rotor core 521 which is formed by laminating magnetic steel plates each having a substantially annular shape. The resolver stator portion 51 and the resolver rotor portion 52 are arranged radially inwardly of the bus bar unit 23.

The resolver stator portion 51 preferably includes a stator core 511 which is formed by laminating thin magnetic steel plates and arranged at the inner circumferential surface of the bracket 24. The stator core 511 preferably includes a core back 5111 having a substantially annular shape, and a plurality (for example, preferably 16 in the present preferred embodiment) of teeth 5112 each extending from the core back 5111 in the radially inward direction. In other words, the teeth 5112 are supported by the core back 5111.

The resolver stator portion 51 preferably includes an insulator 512 which is, in this preferred embodiment, made of a thermoplastic resin covering a surface of the stator core 511, and a plurality (for example, preferably 3 in the present preferred embodiment) of coils 513 formed by winding a wire around the plurality of teeth 5112 via the insulator 512. According to the present preferred embodiment, the insulator 512 is preferably dividable into two pieces in the axial direction which sandwich the stator core 511 from both axial directions.

Figure 4:
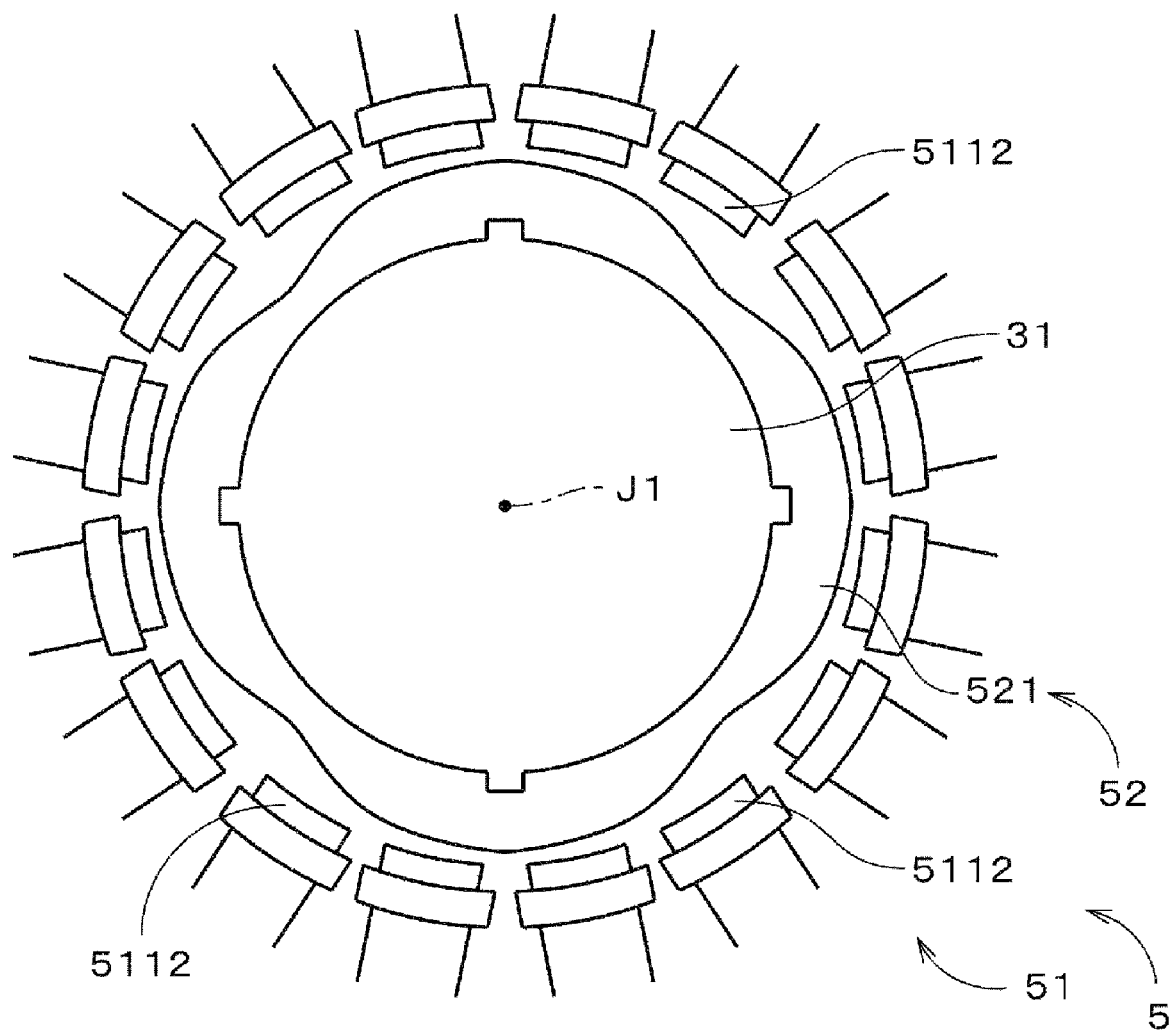
FIG. 4 is a schematic plan view of a shaft and a portion of the resolver according to the first preferred embodiment of the present invention.

FIG. 4 is a schematic plan view of the shaft 31 and a portion of the resolver 5 according to the first preferred embodiment of the present invention. Note that the coils 513 of the resolver stator portion 51 are omitted from FIG. 4. Also, the cross section of the shaft 31 is depicted without parallel diagonal lines. As shown in FIG. 4, the rotor core 521 of the resolver rotor portion 52 is arranged via a gap from an inner circumferential surface of the resolver stator portion 51.

According to the motor 1 of the present preferred embodiment of the present invention, a torque (rotary force) generated between the armature 22 of the motor stator portion 2 and the field magnet 33 of the motor rotor portion 3 rotates the shaft 31 in a concentric manner with the central axis J1, which rotates, along with the motor rotor portion 3 (see FIG. 3), the rotor core 521 of the resolver rotor portion 52 in the concentric manner with the central axis J1. Since the resolver stator portion 51 is affixed to the motor stator portion 2 (see FIG. 3) via the bracket 24 as described above, the rotor core 521 of the resolver rotor portion 52 is rotatably supported with respect to the resolver stator portion 51 via the shaft 31 and the bearing mechanism 4.

Figure 5:
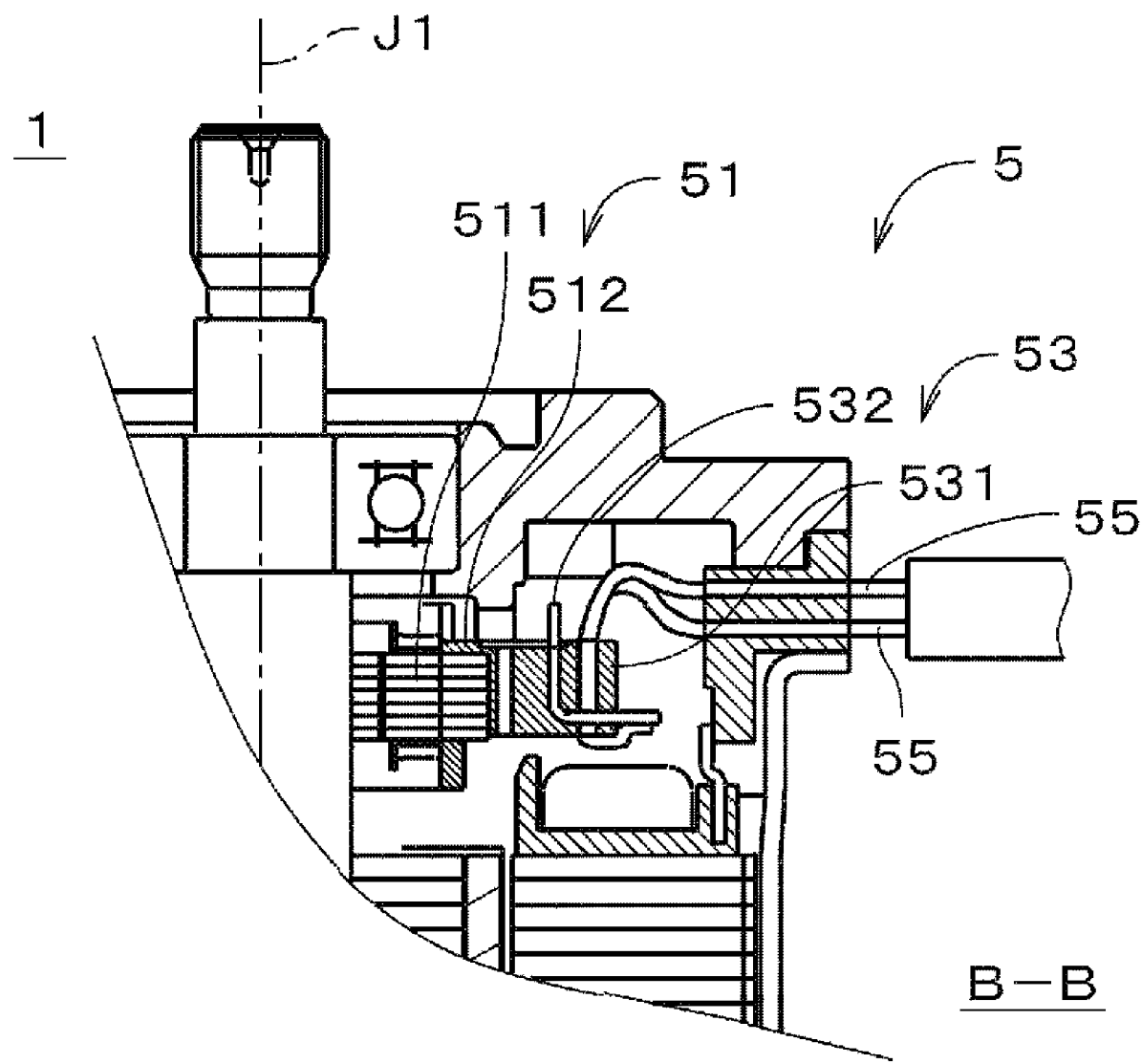
FIG. 5 is a schematic cross sectional view of a portion of the motor according to the first preferred embodiment of the present invention.

FIG. 5 is a schematic cross sectional view of a portion of the motor 1 taken along a segment line B-B shown in FIG. 2. As shown in FIG. 5, the resolver 5 preferably further includes a connector portion 53 which connects the resolver stator portion 51 to a lead wire 55 (i.e., exterior wiring). Also, the resolver stator portion 51 is connected to a control unit 63 (i.e., external control portion), which is shown in FIG. 1, via the lead wire 55. The connector portion 53 protrudes radially outwardly from the resolver stator portion 51, and is arranged at an opening of the bus bar unit 23.

The connector portion 53 preferably includes a terminal block 531 which protrudes radially outwardly from the resolver stator portion 51, and a plurality (for example, preferably 6 in the present preferred embodiment) of terminal pins 532 arranged to protrude from the terminal block 531 in the upward direction substantially perpendicularly to the central axis J1. Note that FIG. 5 depicts one terminal pin 532. Also, the terminal pins 532 according to the present preferred embodiment are preferably made of copper, for example.

Figure 6:
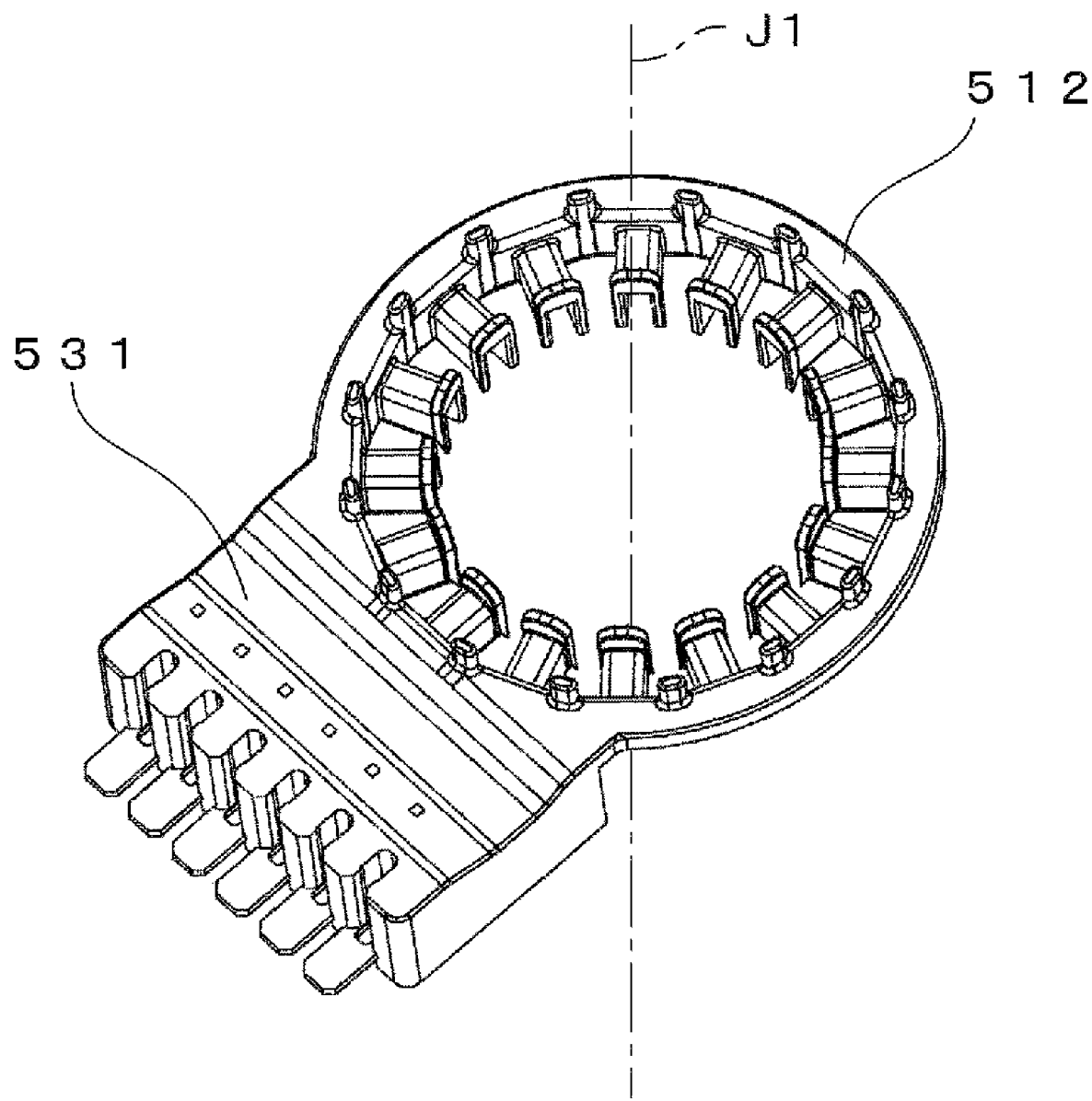
FIG. 6 is a schematic perspective view of an insulator portion according to the first preferred embodiment of the present invention.

The terminal block 531, shown in FIG. 6, is preferably made of a resin material having thermoplasticity and made integrally with the insulator 512 which is also preferably made of the resin material having thermoplasticity.

Figure 7:
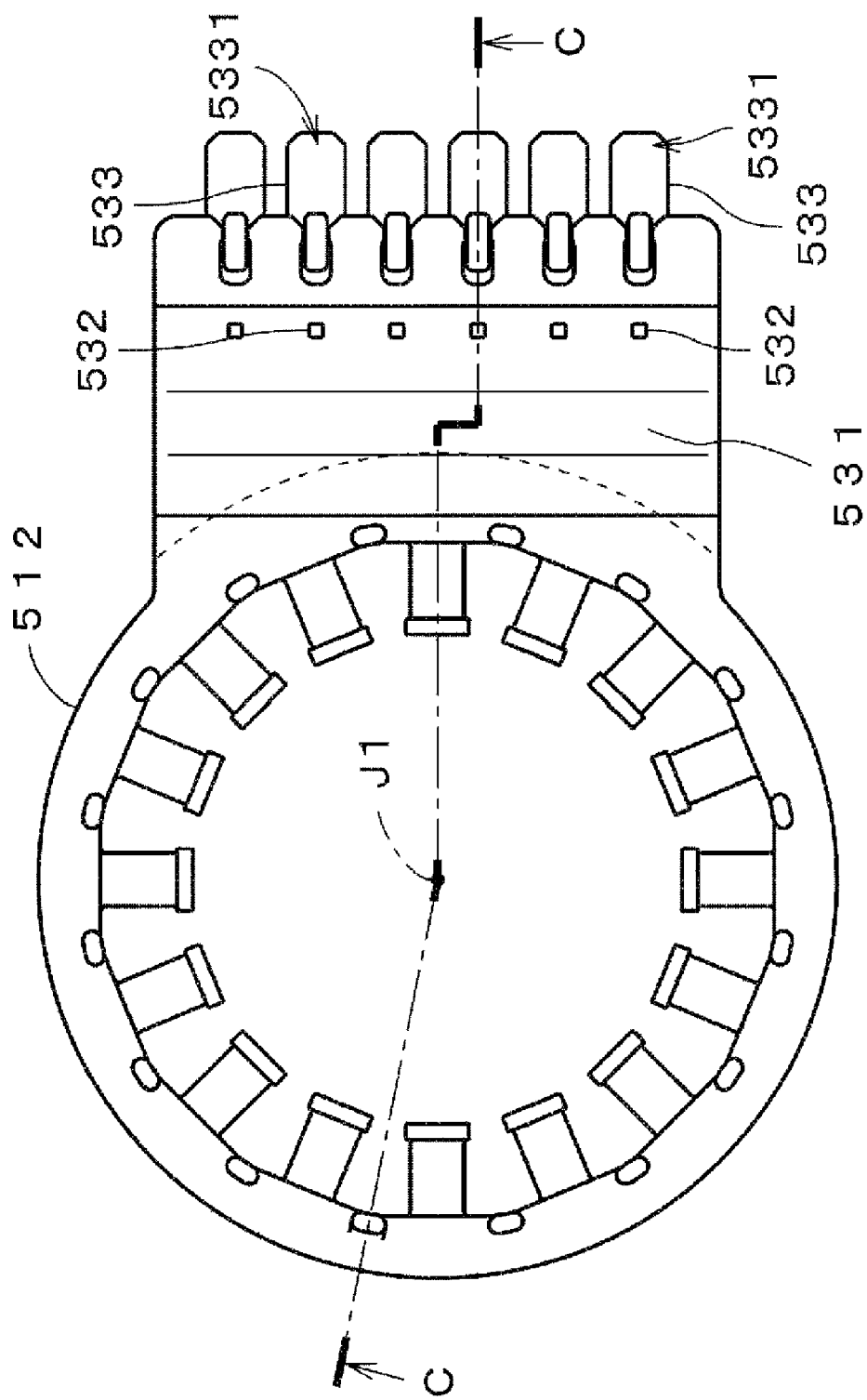
FIG. 7 is a schematic plan view of the insulator portion and a terminal pin according to the first preferred embodiment of the present invention.
Figure 8:
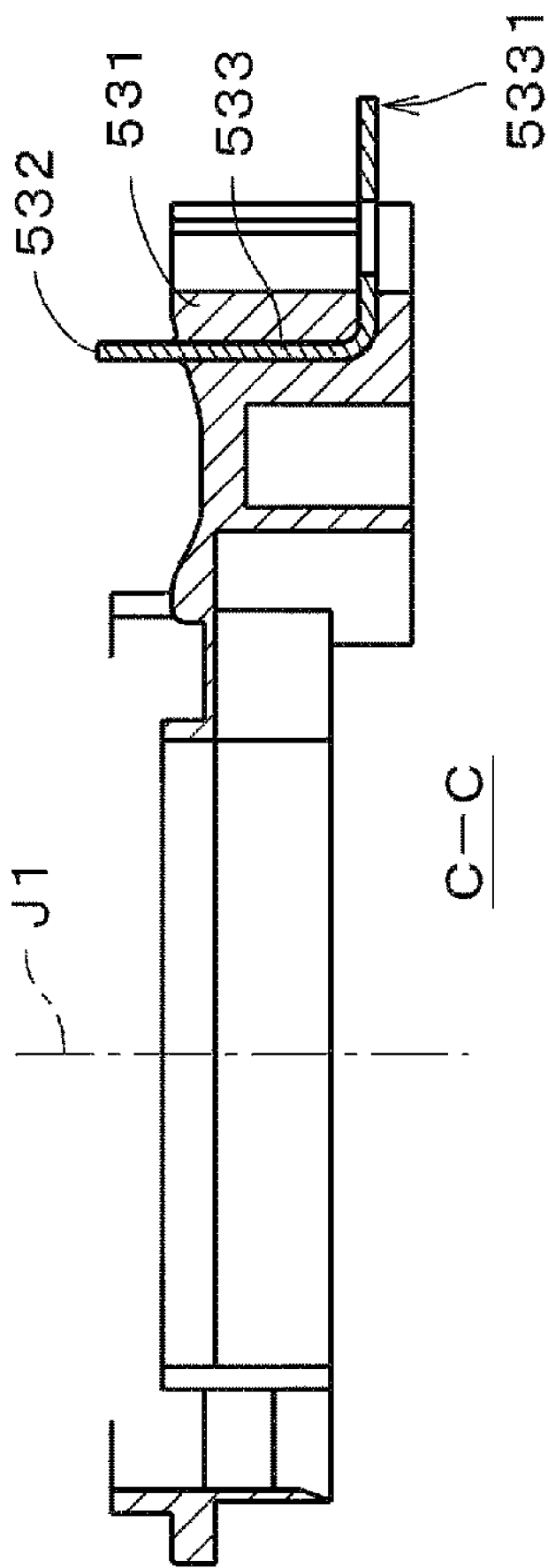
FIG. 8 is a schematic cross sectional view of the insulator portion and the terminal pin according to the first preferred embodiment of the present invention.

FIG. 7 is a schematic plan view of the terminal block 531, the insulator 512 and the terminal pins 532. FIG. 8 is a schematic cross sectional view of a portion of the insulator 512 and the terminal pin 532 taken along a segment line C-C shown in FIG. 7.

As shown in FIGS. 7 and 8, the terminal pins 532 each have a substantially prism shape and are arranged at an end portion of resolver terminals 533 each having a substantially L-shape. Also, the resolver terminals 533 each include an end portion 5331 at which the resolver terminal 533 is connected to the control unit 63 via the lead wire 55 (see FIG. 5). Note that the terminal pins 532 are affixed to the terminal block 531 preferably by insert molding.

Figure 9:
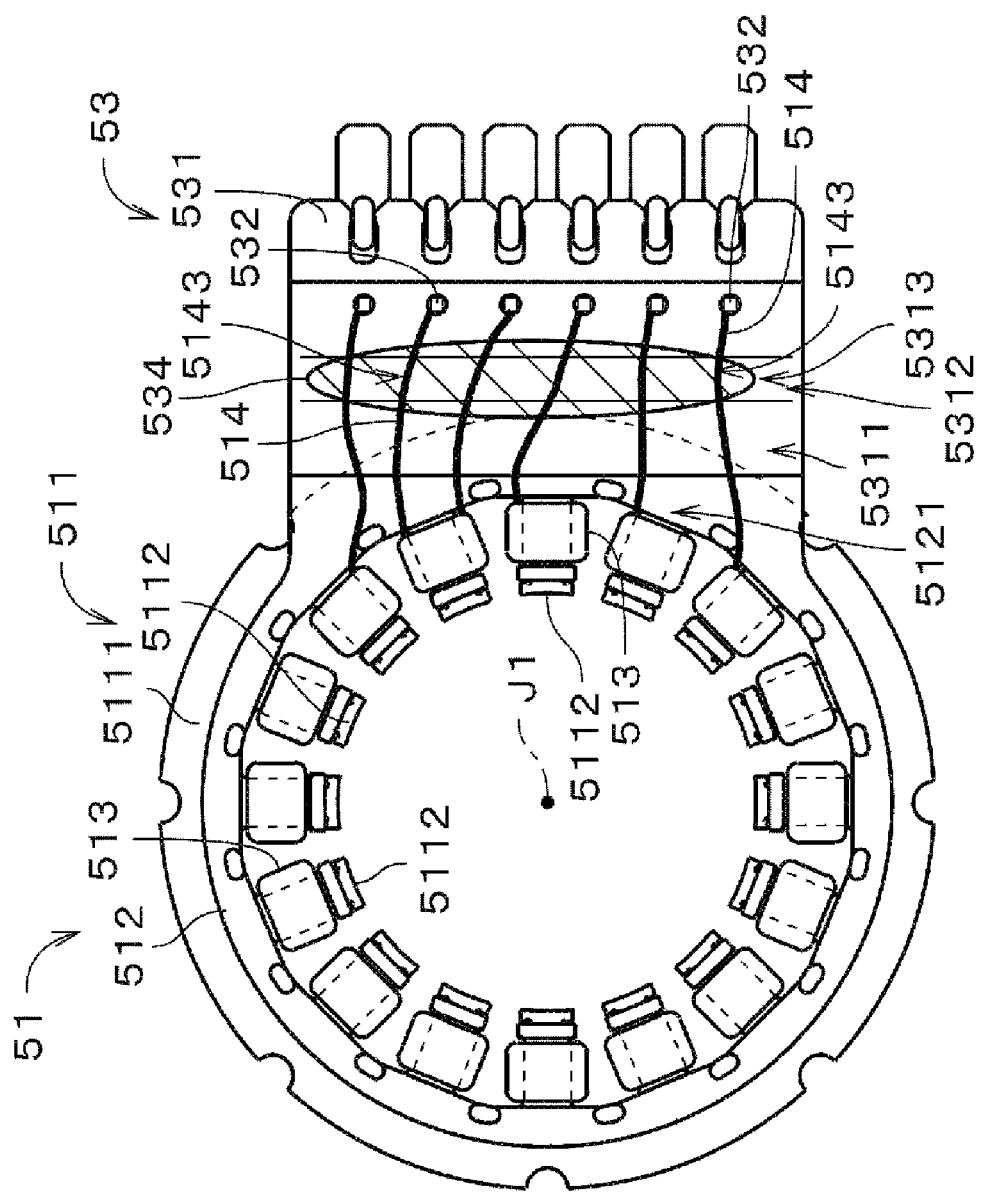
FIG. 9 is a schematic plan view of a resolver stator portion and a connector portion according to the first preferred embodiment of the present invention.
Figure 10:
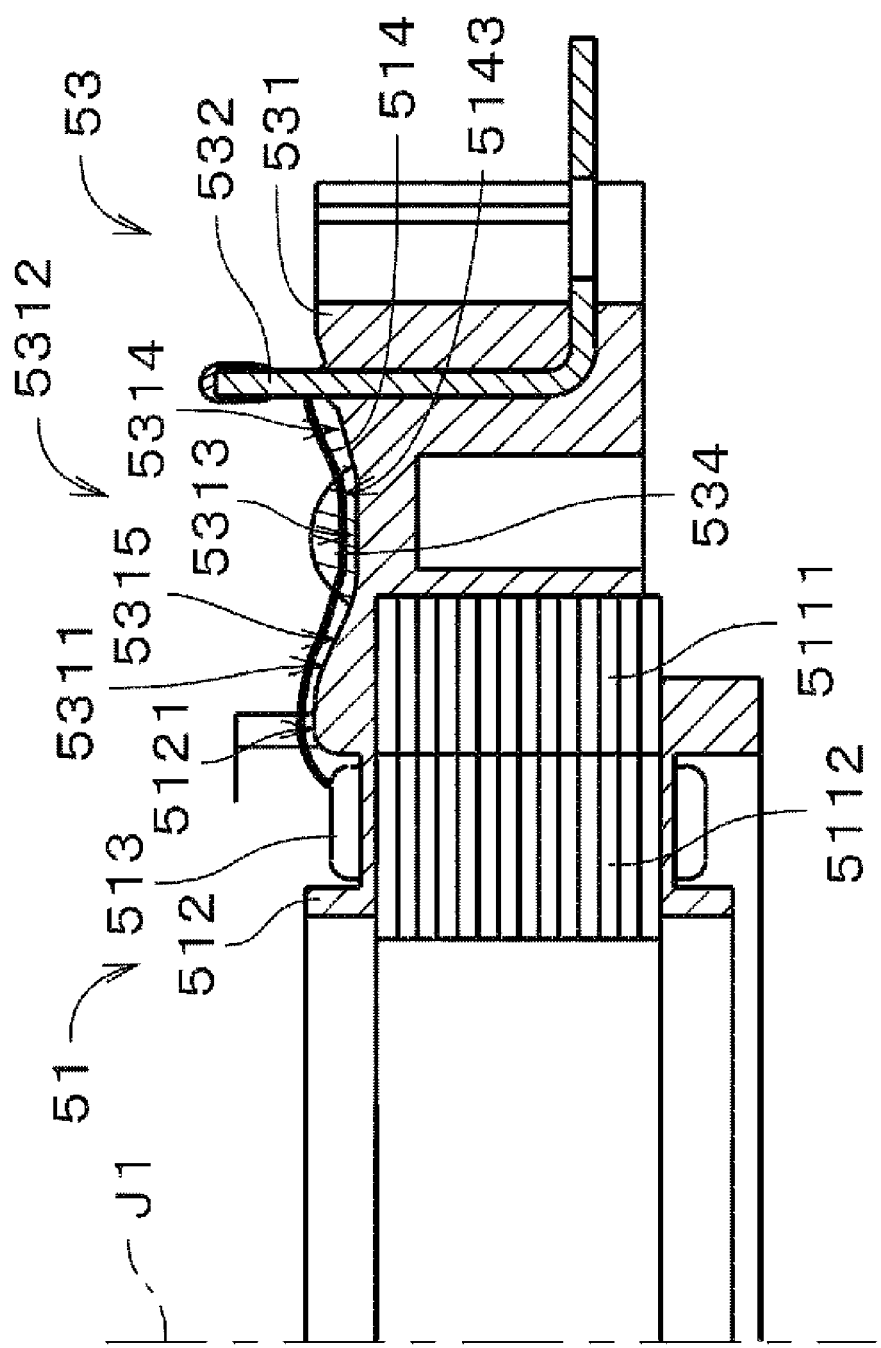
FIG. 10 is a schematic cross sectional view of a portion of the resolver stator portion and the connector portion according to the first preferred embodiment of the present invention.

FIG. 9 is a schematic plan view of the resolver stator portion 51 and the connector portion 53. FIG. 10 is a schematic cross sectional view of a portion of the resolver stator portion 51 and the connector portion 53. As shown in FIGS. 9 and 10, the wires 514 are wound over a wiring surface 5311 which is arranged above the core back 5111 of the insulator 512 and extends from an annular shape surface 5121 to the terminal pins 532 at which the wires 514 are connected thereto by welding, or the like (e.g., soldering). Note that the wires 514 are connected to the control unit 63 via the terminal pins 532.

According to the present preferred embodiment, the resolver stator portion 51 preferably includes three wires 514, for example, whose end portions are wound around corresponding terminal pins 532 while the other end portions are wound around a plurality of teeth 5112 and the insulator 512 via the wiring surface 5311 of the terminal block 531. The wires 514 are, after being wound around the teeth 5112, are led back to the terminal pins 532 each of which is different from the terminal pins 532 that the wires 514 are connected at the other ends. According to the resolver 5 of the present preferred embodiment, an exciting coil includes one of the wires 514 and an output coil includes two of the wires 514.

Figure 11A:
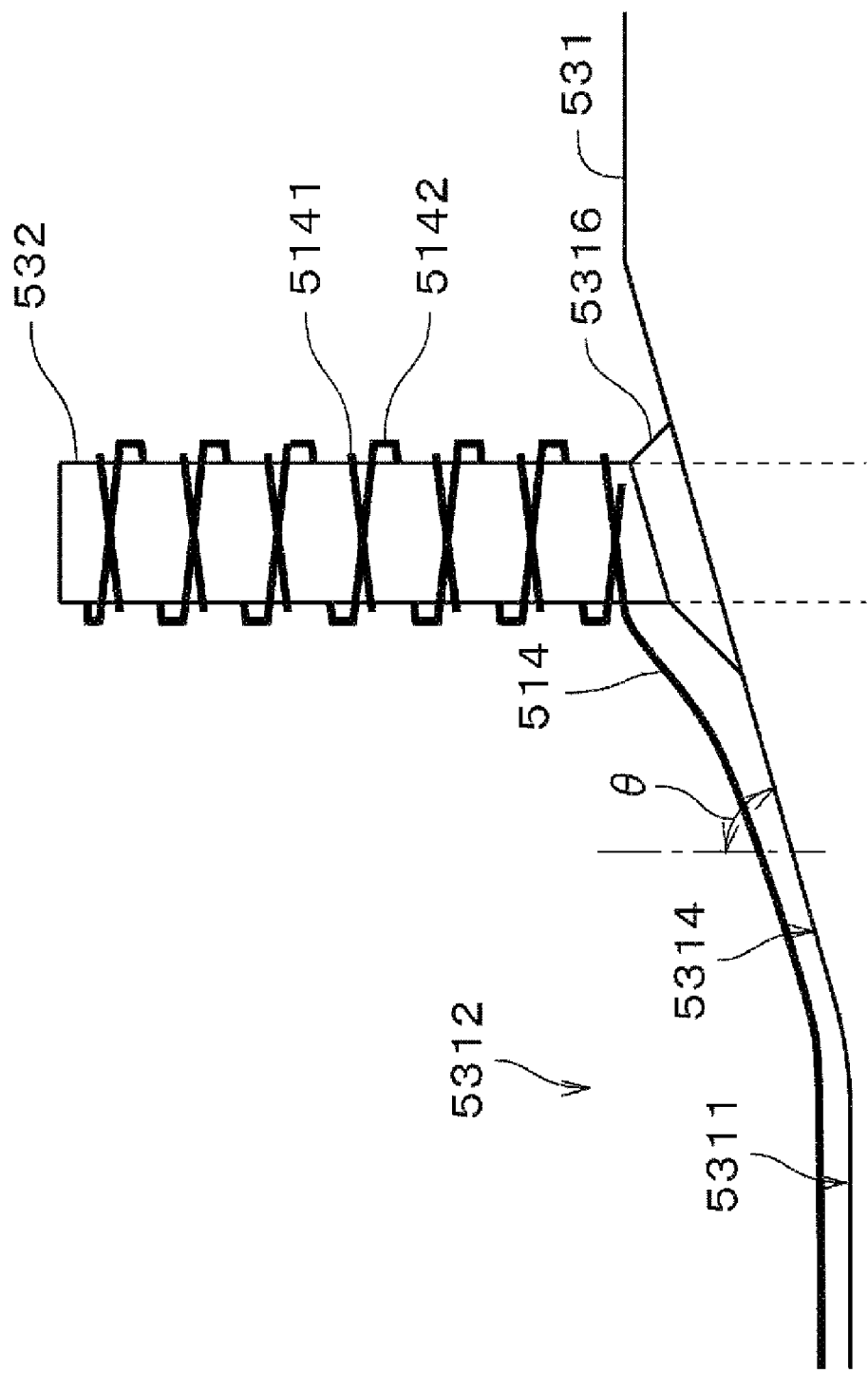
FIG. 11A is a schematic diagram showing an enlarged view of a terminal pin according to the first preferred embodiment of the present invention.

FIGS. 11A and 11B each show an enlarged view of one of the terminal pins 532 and its surrounding area. FIG. 11A shows an end portion of the terminal pin 532 prior to the execution of welding or the like. The wire 514 preferably includes, as shown in FIG. 11A, a first winding portion 5141 which is a portion of the wire 514 wound around the terminal pin 532 in the upward direction from a substantially bottom portion of the terminal pin 532, and a second winding portion 5142 which is a portion of the wire 514 wound around the terminal pin 532 in the downward direction from the substantially tip portion toward the bottom portion of the terminal pin 532.

According to the present preferred embodiment, the welding is executed, as shown in FIG. 11B, from the tip portion of the terminal pin 532 connecting the first winding portion 5141, a portion of the second winding portion 5142 and the terminal pin 532.

As shown in FIGS. 9 and 10, the connector portion 53 preferably includes a groove portion 5312 which extends over the terminal block 531 in a direction substantially parallel with terminal pins 532. It is to be appreciated that each wire 514 includes at a portion between the coil 513 and the terminal pin 532 a slackened portion 5143 (described below) so as to connect the corresponding coils 513 and the corresponding terminal pins 532 without excessive tension therebetween. The slackened portions 5143 are accommodated at the groove portion 5312 and are affixed to a bottom portion 5313 of the groove portion 5312 by an adhesive 534 having flexibility.

As shown in FIG. 10, the groove portion 5312 preferably includes a first inclined surface 5314 which extends from the bottom portion 5313 toward the terminal pins 532, and a second inclined surface 5315 which extends from the bottom portion 5313 toward the annular shape surface 5121. Note that the second inclined surface 5315 and the annular shape surface 5121 are connected continuously via a round surface.

As shown in FIG. 11A, $\theta$ which is an angle defined between the first inclined surface 5314 and the central axis J1 is preferably greater than approximately 45° and smaller than approximately 90°, for example. According to the present preferred embodiment, the angle is preferably and approximately 75°, for example. Also, an angle defined between the second inclined surface 5315 and the central axis J1 is preferably greater than approximately 45° and smaller than approximately 90°, for example. According to the present preferred embodiment, the angle preferably is approximately 75°, for example.

The terminal block 531 preferably includes a convex portion 5316 which is arranged above the first inclined surface 5314 surrounding each terminal pin 532. The convex portions 5316 are formed integrally with the terminal block 531 and the insulator 512. Note that as shown in FIG. 11A, the convex portion 5316 preferably connects a lower portion of the terminal pin 532 and an area surrounding the bottom end portion of the terminal pin in a substantially straight line.

Figure 12:
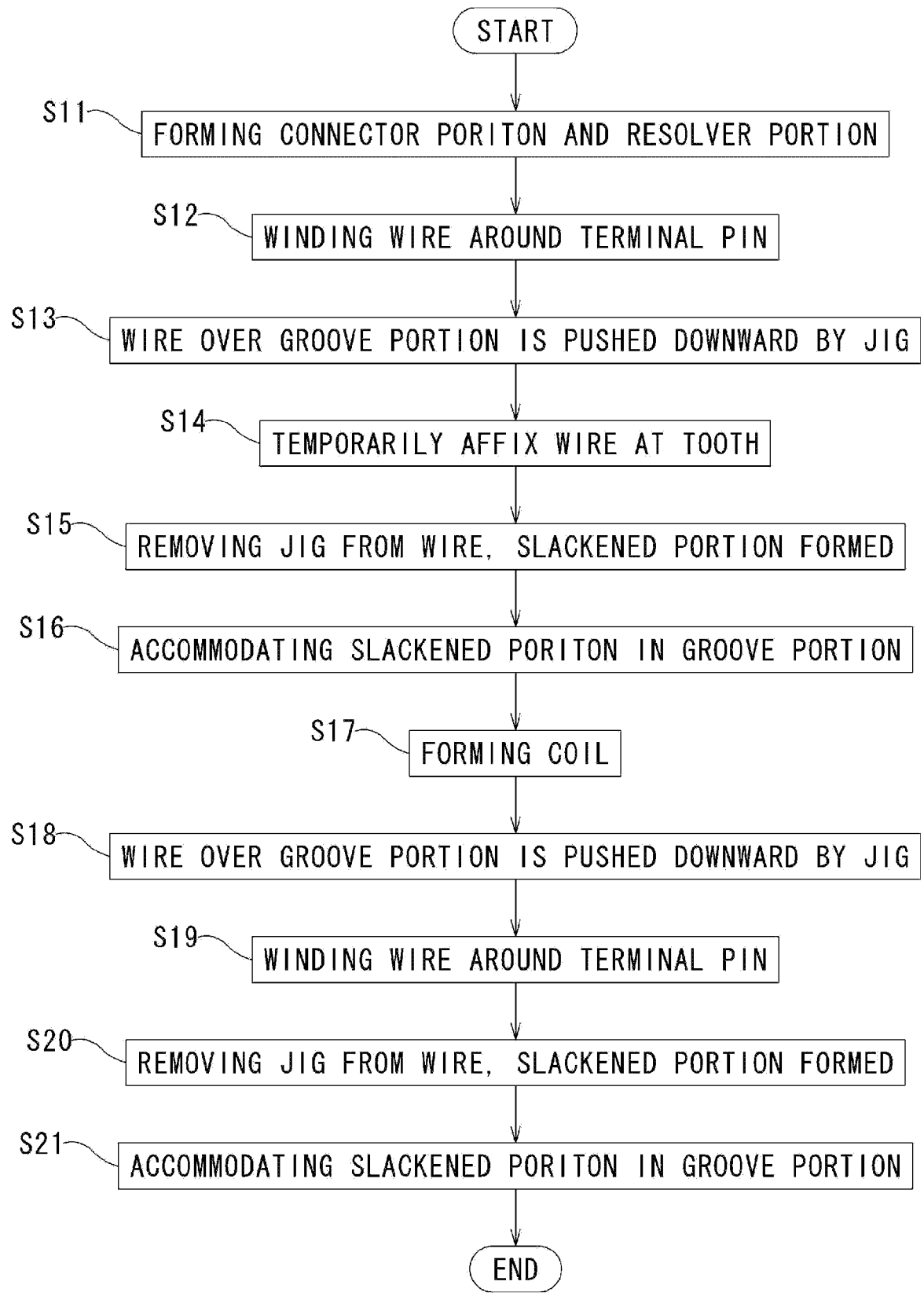
FIG. 12 is a flow chart illustrating a flow of steps of connecting a wire to the resolver stator portion and the connector portion according to the first preferred embodiment of the present invention.
Figure 13A:
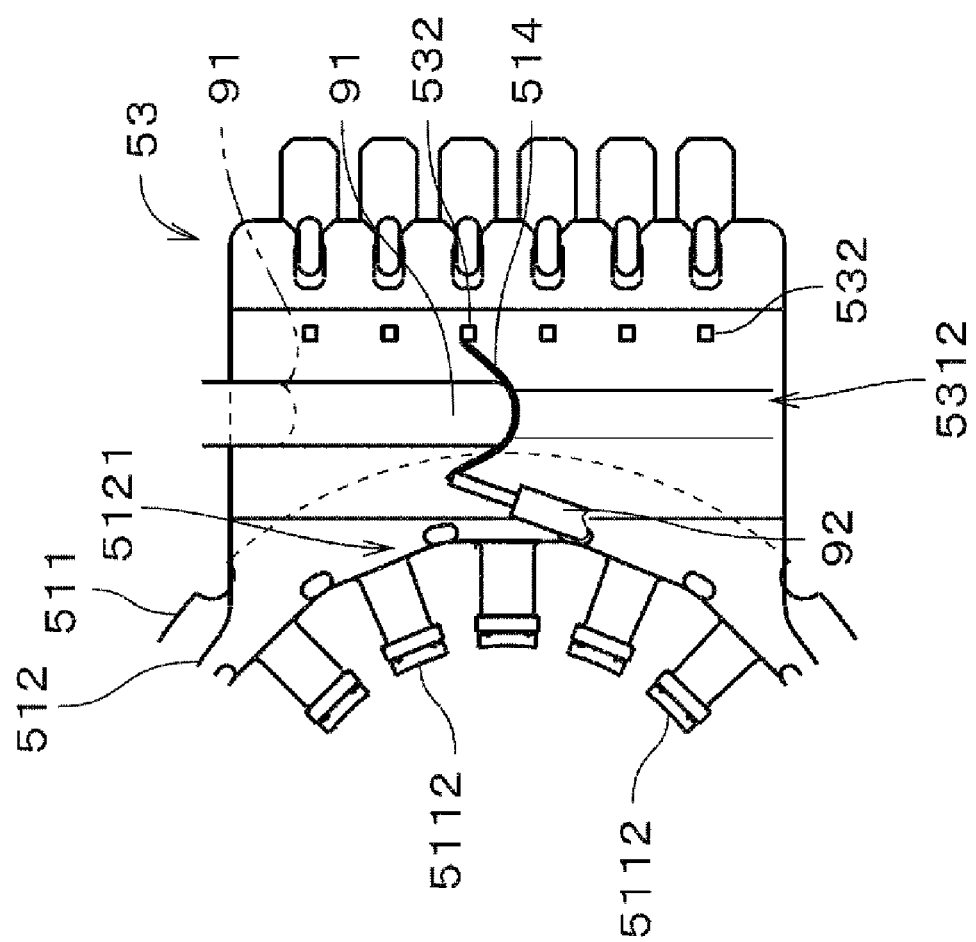
FIG. 13A is a schematic diagram showing a portion surrounding the terminal pin while the wire is connected thereto according to the first preferred embodiment of the present invention.
Figure 13B:
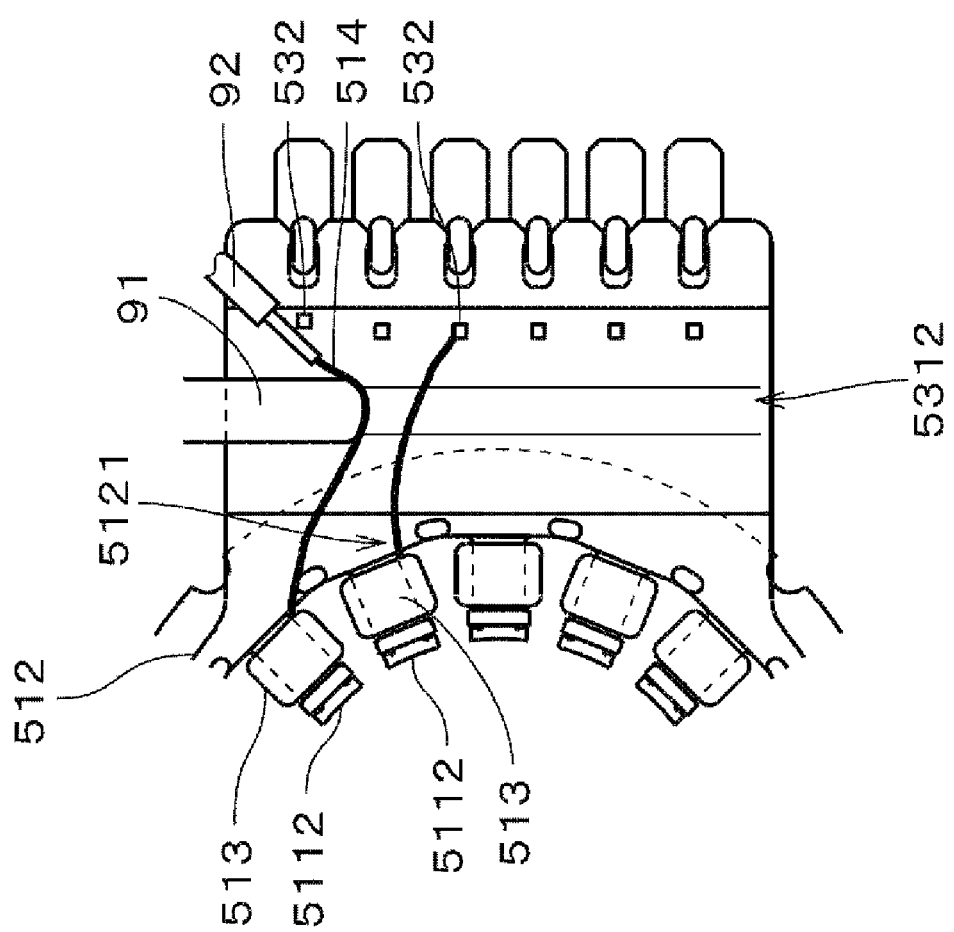
FIG. 13B is a schematic diagram showing a portion surrounding the terminal pin while the wire is connected thereto according to the first preferred embodiment of the present invention.

Hereinafter, a connecting method of the wire 514 which is executed during a manufacturing process of the resolver 5 will be described. FIG. 12 is a flow chart illustrating a flow of steps connecting the wire 514 to the resolver stator portion 51 and the connector portion 53. FIGS. 13A and 13B each is a schematic diagram showing a portion surrounding the terminal pin 532 while the wire 514 is connected thereto.

First, the insulator 512 which is formed integrally with the connector portion 53 is attached to both axial ends of the stator core 511 so as to form the connector portion 53 and the resolver stator portion 51 (except the wire 514) (step S11).

Next, the wire 514 is wound by a wire winding apparatus around one of the terminal pins 532 from the substantially bottom portion thereof. The end portion of the wire 514 is retained near the bottom portion of the terminal pin 532 by a retaining portion of the winding apparatus, and then a nozzle 92 of the winding apparatus circles around the terminal pin 532 toward the tip portion of the terminal pin 532 in order to form the first winding portion 5141.

Next, the nozzle 92 circles around the terminal pin 532 in a downward direction so as to form the second winding portion 5142 (step S12). When the second winding portion 5142 is formed, the end portion of the wire 514 retained by the retaining portion is released.

After the wire 514 is wound by the nozzle 92 around the terminal pin 532 to form the first winding portion 5141 and the second winding portion 5142, the nozzle 92 moves toward the stator core 511. At this point, a stick like jig 91 (depicted by a chain double dash line in FIG. 13A) is arranged at the groove portion 5312. Note that a height of the jig 91 is preferably greater than a depth of the groove portion 5312 in the axial direction such that an upper portion of the jig 91 protrudes from the groove portion 5312.

Next, the jig 91 moves within the groove portion 5312 to a portion directly in the way of a shortest path (i.e., the jig 91 moves downward in FIG. 13B) between the terminal pin 532 at which the wire 514 is wound and a predetermined tooth 5112 at which the said wire 514 is to be wound around. As a result, a portion of the wire 514 corresponding to the groove portion 5312 makes contact with the jig 91 and is pushed downward (see FIG. 13B) (step S13).

Next, the nozzle 92 moves across the annular shape surface 5121 of the insulator 512 to the corresponding tooth 5112, and circles around approximately three times the tooth 5112 so as to temporarily affix the wire 514 at the tooth 5112 (step S14). Note that the wire 514 wound around the tooth 5112 is lead between the terminal pin 532 and the tooth 5112 in a non-shortest path therebetween (i.e., the wire 514 detours around the jig 91).

Next, the jig 91 moves in an opposite direction (i.e., upward in FIG. 13B) within the groove portion 5312 so as to form the slackened portion 5143 as shown in FIG. 9 (step S15). The slackened portion 5143 is then pushed by another jig (not shown) to the bottom portion 5313 of the groove portion 5312 so as to be accommodated therein (step S16).

Next, the wire 514 is wound around the predetermined teeth 5112 in a sequential manner by the nozzle 92 so as to form the plurality of coils 513 which are connected in series (step S17).

Next, the wire 514 wound around the teeth 5112 is led over the annular shape surface 5121 and the groove portion 5312 toward the terminal pin 532. Then, the jig 91 moves back to the position as illustrated in FIG. 13B so as to push the portion of the wire 514 corresponding to the groove portion 5312 in the downward direction (according to FIG. 13B) such that the wire 514 detours around the jig 91 from the shortest route connecting the corresponding tooth 5112 and the corresponding terminal pin 532 (step S18).

Then, the wire 514 which is forced to detour from the shortest route in step S18 is wound around the corresponding terminal pin 532 (step S19). Note that when the wire 514 is wound around the corresponding terminal pin 532, the wire 514 is wound from the substantially bottom portion toward the tip portion and back to the substantially bottom portion of the terminal pin 532 forming the first winding portion 5141 and the second winding portion 5142 (see FIG. 11A).

Next, after the wire 514 is wound around the terminal pin 532, the jig 91 moves upward according to FIG. 13B within the groove portion 5312. As a result, the slackened portion 5143 as shown in FIG. 9 is generated at the wire 514 between the corresponding terminal pin 532 and the corresponding tooth 5112 (step S20). The slackened portion 5143 is then pushed by the other jig (not shown) to the bottom portion 5313 of the groove portion 5312 so as to be accommodated therein. Then, the wire 514 is cut at the end portion of the nozzle 92 to complete the connection of one of the wires 514 (step S21).

After the above described steps S11 to S21 are carried out with each wire 514, welding is carried out to each tip of the terminal pin 532 so as to complete the connection between the wire 514 and the terminal pins 532. Also, the adhesive 534 is arranged at the bottom portion 5313 of the groove portion 5312 so as to affix the slackened portions 5143 to the groove portion 5312.

As described above, according to the resolver 5 of the motor 1 of the present preferred embodiment, the wires 514 each include the slackened portions 5143 at a portion between the terminal pins 532 and the coils 513. By virtue of such configuration, the shocks and vibrations applied to the resolver 5 are not directly applied to the wire 514 between the terminal pin 532 and the coil 513, which minimizes the possibility of damaging the wire 514. Also, since the slackened portion 5143 is accommodated within the groove portion 5312 arranged at the wiring surface 5311, the possibility of the slackened portion 5143 being tangled with another component causing the wire 514 to be damaged is minimized, which improves the reliability of the connection between the terminal pin 532 and the coil 513, and which also improves the efficiency of the manufacturing process of motor 1.

Also, since the groove portion 5312 according to the present preferred embodiment accommodates therein all the slackened portions 5143, compared with a configuration in which a plurality of concave portions each accommodate therein an individual slackened portion, the accommodating process becomes simpler, and thus improving the reliability of the connection between the terminal pin 532 and the coil 513.

Also, since the slackened portions 5143 are securely affixed at the groove portion 5312 by the adhesive 534 having flexibility, the wires 514 between the terminal pins 532 and the coils 513 absorbs the vibrations and shocks, which improves the reliability of the connections between the terminal pins 532 and the coils 513.

Also, since the groove portion 5312 which is arranged between the terminals pins 532 and the teeth 5112 has arranged therein the jig 91 which moves in the direction substantially perpendicular with respect to the central axis J1, the wire 514 makes contact securely with the jig 91 so as to form the slackened portion 5143 effectively.

Also, since the terminal block 531 includes the second inclined surface 5315 which extends from the bottom portion 5313 of the groove portion 5312 to the annular shape surface 5121 of the insulator 512, and whose angle with respect to the central axis J1 is greater than about 45° and smaller than about 90°, for example, an angle at an outer edge of (i.e., axially upper edge) of the groove portion 5312 is substantially blunt such that the wire 514 will not be damaged by the edge. By virtue of such configuration, the reliability of the connections between the terminal pins 532 and the coils 513 is improved.

Also, since the portion connecting the second inclined surface 5315 and the annular shape surface 5121 includes a round surface, the possibility of the wire 514 being damaged by a sharp corner connecting the surfaces is minimized. By virtue of such configuration, the reliability of the connection between the terminal pins 532 and the coils 513 is improved.

It is to be noted that since the terminal pins 532 are arranged above the first inclined surface 5314, even if deformation occurs at the terminal block 531 and the bottom portion of the terminal pins 532 due to the heat applied thereto during the welding process, the slackened portion 5143 will not contact the terminal block 531 at a portion thereof surrounding the terminal pins 532. By virtue of such configuration, the deformation occurring at the terminal block 531 and the bottom portion of the terminal pin 532 will not interfere with the slackened portion 5143, which improves the reliability of the connection between the terminal pins 532 and the coils 513.

A motor which is used in the vehicle such as a passenger car or the like such as the one used in the power steering apparatus is expected to be reliable, operate accurately in various types of environments, and withstand vibrations and shocks. As described above, with the resolver 5 according to the present preferred embodiment of the present invention, the reliability of the connections between the terminal pin 532 and the coil 513 is improved and the possibility of damaging the wire 514 is minimized, and therefore the resolver 5 is particularly suitable for use in the motor used in the vehicle or the like.

Note that according to the resolver 5 of the present preferred embodiment, the terminal block 531, the insulator 512 and the terminal pins 532 are preferably formed by insert molding or the like. When the insert molding is carried out, if there is a gap between a hole formed at the mold and a component which corresponds to a terminal pin and is inserted in the hole, burrs surrounding the terminal pin may be formed. Also, when a normal line of a surface of a terminal block near a portion thereof adjacent to its terminal pin is parallel with the terminal pin, burrs surrounding the terminal pin may be formed when removing the terminal block from the mold.

According to the present preferred embodiment, since the terminal block 531 includes the convex portion 5316 which is arranged surrounding the terminal pin 532 and is inclined toward the terminal pins 532, the possibility of generating a gap between the mold and the terminal pin 532 is minimized. Also, the normal line of the surface of the terminal block near the portion thereof adjacent to the terminal pin 532 is made unparallel with the terminal pin 532. By virtue of such configuration, the possibility of generating burrs at the portions surrounding the terminal pins 532 is minimized which improves the accuracy of winding of the wire 514 around the terminal pins 532. Therefore the connection between the terminal pin 532 and the coil 513 is improved.

Also, according to the present preferred embodiment, since the terminal block 531 includes the first inclined surface 5314, when the wire 514 is connected to the terminal pin 532, the slackened portion 5143 of the wire 514 will not contact the heated and deformed terminal block 531.

Also, since the possibility of generating burrs during the manufacturing process of the resolver 5 is minimized, the manufacturing process of the resolver 5 is simplified. Also, since the mold used to form the terminal block 531 includes the hole for the convex portion 5316, inserting the terminal pin 532 becomes easier which simplifies the manufacturing of the resolver 5 and the motor 1.

Also, according to the present preferred embodiment, the wire 514 forms the first winding portion 5141 which is wound around the terminal pin 532 by the second winding portion 5142. By virtue of such configuration, the possibility of the wire 514 coming unwound before executing the welding is minimized, and therefore, the connection between the wire 514 and the terminal pin 532 is secured, thereby improving the reliability of the connection between the terminal pin 532 and the coil 513.

Also, according to the present preferred embodiment, the second winding portion 5142 extends beyond a portion of the terminal pin 532 at which the welding is carried out, the wire 514 is securely connected to the terminal pin 532.

Figure 14:
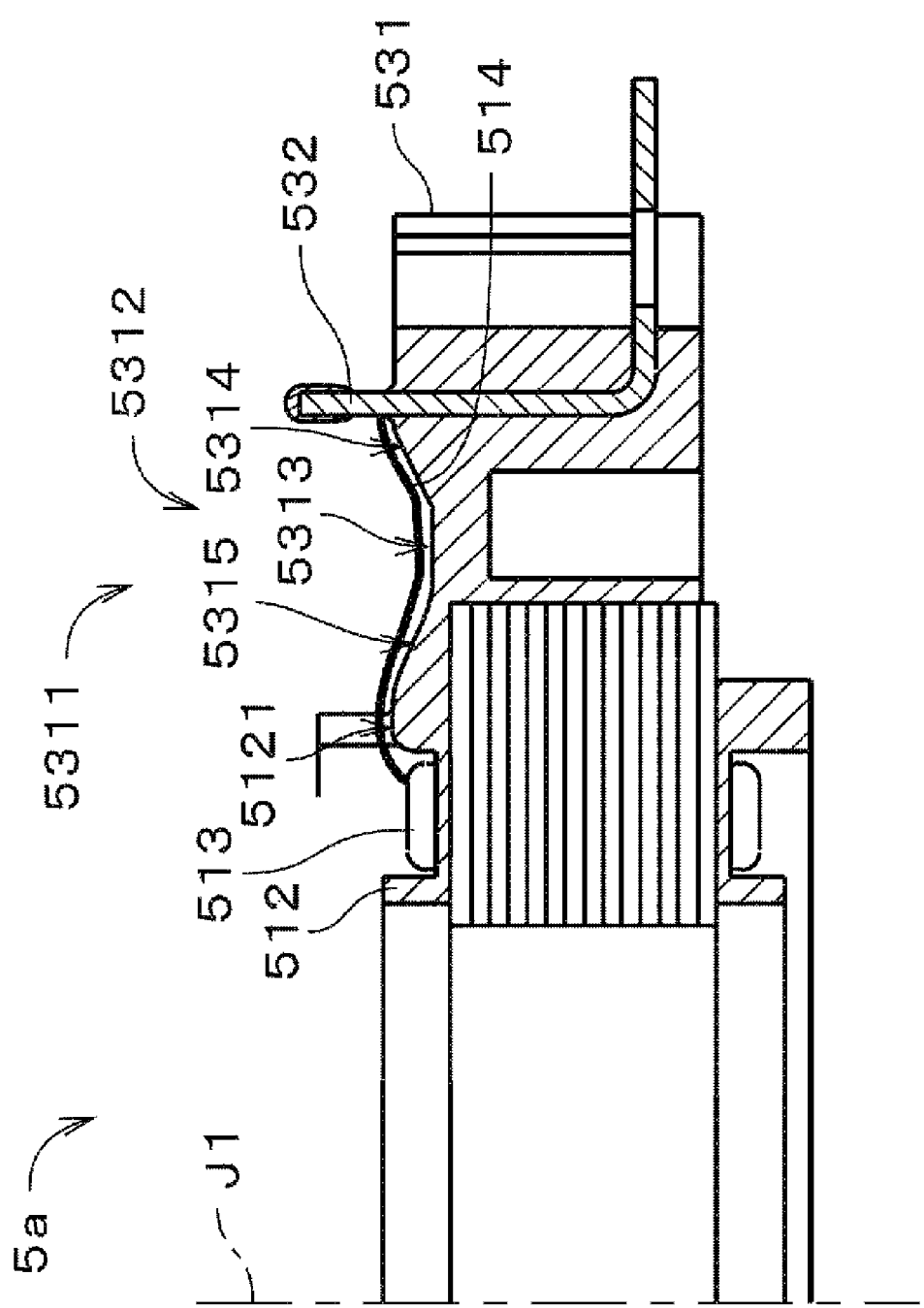
FIG. 14 is a schematic cross sectional view of a portion of a resolver according to a second preferred embodiment of the present invention.

Hereinafter, a resolver according to a second preferred embodiment of the present invention will be described. FIG. 14 is a schematic cross sectional view of a portion of a resolver 5a according to the second preferred embodiment. As shown in FIG. 14, a configuration of the resolver 5a is preferably substantially the same as the configuration of the resolver 5 except for an arrangement of the terminal pin 532 and a shape of the terminal block 531 shown in FIG. 10. Note that elements of the resolver 5a according to the second preferred embodiment similar to those already described for the resolver 5 according to the first preferred embodiment are denoted by similar reference numerals and description thereof is omitted.

As shown in FIG. 14, the resolver 5a preferably includes the first inclined surface 5314 arranged at the groove portion 5312 extending toward the terminal pins 532 from the bottom portion 5313, and the second inclined surface 5315 extending from the bottom portion 5313 to the annular shape surface 5121 of the insulator 512. At this point, the terminal pins 532 are arranged radially outwardly of the first inclined surface 5314 of the wiring surface 5311.

A round surface is arranged between the first inclined surface 5314 and the wiring surface 5311 at the bottom of the terminal pins 532 so as to smoothly connect the first inclined surface 5314 and the wiring surface 5311 at the bottom of the terminal pins 532. Also, a round surface is arranged between the second inclined surface 5315 and the annular shape surface 5121 so as to smoothly connect the second inclined surface 5315 and the annular shape surface 5121.

According to the resolver 5a, an angle defined between the first inclined surface 5314 and the central axis J1 and an angle that is defined between the second inclined surface 5315 and the central axis J1 each are preferably greater than approximately 45° and smaller than approximately 90°, for example. By virtue of such configuration, the possibility of the wire 514 being damaged by the axially upper end of the first inclined surface 5314 and the axially upper end portion of the second inclined surface 5315 is minimized improving the reliability of the connection between the terminal pin 532 and the coil 513.

While the present invention has been described in detail, the foregoing description is in all aspects illustrative and not restrictive. It is understood that numerous modifications and variations can be devised without departing from the scope of the invention.

For example, although the resolver 5 according to the first preferred embodiment preferably includes the second inclined surface 5315 arranged between the bottom portion 5313 and the annular shape surface 5121, the present invention is not limited thereto. The side of the groove portion 5312 toward the annular shape surface 5121 may by substantially perpendicular to the bottom portion 5313. It is to be noted that when the side of the groove portion 5312 connected to the annular shape surface 5121 is arranged in the parallel direction with the central axis J1 (i.e., the side is arranged substantially perpendicularly to the bottom portion 5313), the round surface is arranged at the portion connecting the groove portion 5312 and the annular shape surface 5121 so as not to damage the wire 514. By virtue of such configuration, the reliability of the connection between the terminal pins 532 and the coils 513 is improved.

Although the preferred embodiments described above assume that the groove portion 5312 extends from one end to the other end in the direction the terminal pins 532 are arranged of the terminal block 531, the present invention is not limited thereto.

Although the connecting method described above assumes that the steps S15 to S17 are executed in a sequential manner, the present invention is not limited thereto; the steps may be executed simultaneously.

Note that the slackened portion 5143 described above may be formed in a manner other than that which is described above. For example, the jig 91 may be arranged in advance at a portion in the groove portion 5312 connecting the corresponding terminal pin 532 and the corresponding tooth 5112 in a shortest distance such that when the jig 91 is removed from the portion in the groove portion 5312 after the wire 514 is connected between the corresponding terminal pin 532 and the corresponding tooth 5112 the slackened portion 5143 is formed.

Note that the step S16 described above in which the slackened portion 5143 is accommodated in the groove portion 5312 may be performed for all slackened portions 5143 simultaneously after the corresponding terminal pins 532 and the corresponding teeth 5112 are connected by the wires 514.

Although the preferred embodiments described above assume that the jig 91 has the substantially stick shape, the present invention is not limited thereto. Also, the jig 91 may move in a direction parallel or substantially parallel to the central axis J1 in order to form the slackened portion 5143.

Although the preferred embodiments described above assume that the first winding portion 5141 is formed starting from the bottom portion of the terminal pin 532, the present invention is not limited thereto.

Although the preferred embodiments described above assume that the motor 1 is used in the power steering apparatus, the motor 1 may be used as a power source for an electric vehicle, a hybrid motor vehicle or the like. Also, the motor 1 may be used as a generator for a hybrid motor vehicle or the like. Also, the motor 1 may be used as a power source for any apparatus not related to the vehicle as described above. The resolver according to the preferred embodiments may be used as an angle detection apparatus other than motor 1.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A resolver comprising:
    a stator portion having a substantially annular shape centered about a central axis;
    a rotor portion arranged radially inwardly of the stator portion, including a rotor core and rotatably supported with respect to the stator portion; and
    a connector portion arranged to connect the stator portion to an exterior wiring; wherein
    the stator portion includes:
        a plurality of teeth arranged in a circumferential direction centered about the central axis;
        a core back arranged to support the teeth from radially outside of the teeth;
        an insulator arranged to cover a surface of each tooth and a surface of the core back; and
        a plurality of wires each wound around the teeth via the insulator to define a plurality of coils, and arranged to connect the connector portion with the exterior wiring;
    the connector portion includes:
        a terminal block arranged at the stator portion protruding outwardly in a radial direction; and
        a plurality of terminal pins arranged at the terminal block protruding in an axial direction and connected to the wires; and
        a wiring surface arranged at the terminal block including a groove portion which accommodates therein slackened portions of the wires, the wiring surface extends from an annular shape surface arranged substantially perpendicularly to the central axis above the core back to the terminal pins.

2. The resolver according to claim 1, wherein the wires are affixed to the groove portion of the wiring surface via an adhesive.

3. The resolver according to claim 1, wherein the groove portion includes a first inclined surface extending from a bottom portion of the groove portion to the annular shape surface, and a second inclined surface extending from the bottom portion of the groove portion to the terminal pins.

4. The resolver according to claim 1, wherein a side of the groove portion extending from a bottom portion thereof to the annular shape surface and the annular shape surface are connected to one another via a smooth surface.

5. The resolver according to claim 1, wherein the terminal pins and the wires each are connected to one another by either welding or soldering, the terminal block is made of a resin material having thermoplasticity, and the groove portion includes an inclined surface extending from a bottom portion of the groove portion to the terminal pins.

6. The resolver according to claim 5, wherein the terminal pins each are insert molded to the terminal block so as to be connected thereto, the terminal block includes a convex portion arranged to surround the terminal pin and protrude from the wiring surface, and the convex portion includes a substantially straight line connecting a lower portion of the terminal pin and an area surrounding the terminal pin.

7. The resolver according to claim 1, wherein the terminal block and the insulator are integral with each other are made of a resin material having thermoplasticity.

8. The resolver according to claim 3, wherein an angle defined between the first inclined surface and the central axis is greater than approximately 45° and smaller than approximately 90°, and an angle defined between the second inclined surface and the central axis is greater than approximately 45° and smaller than approximately 90°.

9. The resolver according to claim 3, wherein a first round surface is arranged between the first inclined surface and the wiring surface at the bottom of the terminal pins so as to smoothly connect the first inclined surface and the wiring surface at the bottom of the terminal pins, and a second round surface is arranged between the second inclined surface and the annular shape surface so as to smoothly connect the second inclined surface and the annular shape surface.

10. A motor comprising the resolver according to claim 1.

* * * * *